United States Patent
Hwang et al.

(10) Patent No.: US 7,639,342 B2
(45) Date of Patent: Dec. 29, 2009

(54) FERROELECTRIC COMPOSITE, METHOD OF MANUFACTURING THE SAME AND LIQUID CRYSTAL DISPLAY APPARATUS HAVING THE FERROELECTRIC COMPOSITE

(75) Inventors: Tae-Hyung Hwang, Seoul (KR); Byeong-Seob Ban, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 162 days.

(21) Appl. No.: 11/968,667

(22) Filed: Jan. 3, 2008

(65) Prior Publication Data
US 2008/0220183 A1 Sep. 11, 2008

(30) Foreign Application Priority Data
Mar. 9, 2007 (KR) .................. 10-2007-0023477

(51) Int. Cl.
*C09K 19/02* (2006.01)
*G11C 11/22* (2006.01)

(52) U.S. Cl. .................. 349/172; 365/117; 365/145
(58) Field of Classification Search ............... 349/172; 365/117, 145
See application file for complete search history.

(56) References Cited

U.S. PATENT DOCUMENTS 5,099,344 A * 3/1992 Tsuboyama et al. ......... 349/138
5,165,076 A * 11/1992 Tsuboyama et al. ......... 349/184
6,198,225 B1 * 3/2001 Kano et al. ............... 315/169.3

FOREIGN PATENT DOCUMENTS

| JP | 2004347618 | | 12/2004 |
| JP | 2005247921 | | 9/2005 |
| JP | 2005352415 | | 12/2005 |
| JP | 2005352415 A | * | 12/2005 |

* cited by examiner

*Primary Examiner*—Mike Qi
(74) *Attorney, Agent, or Firm*—Cantor Colburn LLP

(57) ABSTRACT

A ferroelectric composite includes a core including a ferroelectric material and a skin layer including a carbon structure comprising carbon atoms.

25 Claims, 3 Drawing Sheets

100

FERROELECTRIC COMPOSITE, METHOD OF MANUFACTURING THE SAME AND LIQUID CRYSTAL DISPLAY APPARATUS HAVING THE FERROELECTRIC COMPOSITE

CROSS-REFERENCE TO RELATED APPLICATIONS

This application claims priority to Korean Patent Application No. 2007-23477, filed on Mar. 9, 2007, and all the benefits accruing therefrom under 35 USC § 119, the contents of which are herein incorporated by reference in its entirety.

BACKGROUND OF THE INVENTION

1. Field of the Invention

The present invention relates to a ferroelectric composite, a method of manufacturing the ferroelectric composite and a liquid crystal display ("LCD") apparatus having the ferroelectric composite. More particularly, the present invention relates to a ferroelectric composite capable of improving the response speed and afterimage problems of an LCD apparatus and a method of manufacturing the ferroelectric composite and an LCD apparatus having the ferroelectric composite.

2. Description of the Related Art

In general, a liquid crystal display ("LCD") apparatus displays images using optical and electrical properties of liquid crystal, such as an anisotropic refractive index, and an anisotropic dielectric constant. The LCD apparatus has characteristics such as lighter weight, lower power consumption, lower driving voltage, etc., in comparison with other types of display apparatuses such as a cathode ray tube ("CRT"), a plasma display panel ("PDP") and so on.

The LCD apparatus includes an LCD panel displaying images and a light source providing the LCD panel with light. The LCD panel includes a thin-film transistor ("TFT") substrate, an opposing substrate and a liquid crystal layer interposed between the TFT substrate and the opposing substrate. Light generated by the light source passes through the liquid crystal layer, and the liquid crystal layer adjusts the transmittance of the light to display an image.

Active research has been conducted on a ferroelectric composite to improve the response speed and afterimage problems of the LCD apparatus. For example, when a liquid crystal composition includes ferroelectric nanoparticles, an effective electric field in a liquid crystal layer is reinforced so that a driving voltage of the LCD apparatus is decreased, and the response speed of the LCD apparatus is improved. Furthermore, when the liquid crystal composition includes a carbon nanotube, carbon-carbon sp2 bonds of the carbon nanotube absorb impurities, such as ions, in the liquid crystal layer, and reduce a rotational viscosity of liquid crystal molecules. Thus, the response speed and the afterimage problems of the LCD apparatus may be improved.

However, when the liquid crystal composition includes ferroelectric nanoparticles, the ferroelectric nanoparticles may cohere with each other or may react with the liquid crystal molecules since the chemical reactivity of the ferroelectric nanoparticles is relatively high.

Furthermore, when the liquid crystal composition includes the carbon nanotube, alignment of the liquid crystal molecules may be hindered since the length of the carbon nanotube is relatively long.

BRIEF SUMMARY OF THE INVENTION

An exemplary embodiment provides a ferroelectric composite capable of improving the response speed and afterimage problems of a liquid crystal display ("LCD") apparatus.

An exemplary embodiment provides a method of manufacturing the above-mentioned ferroelectric composite.

An exemplary embodiment provides an LCD apparatus having the above-mentioned ferroelectric composite.

In an exemplary embodiment, a ferroelectric composite includes a core including a ferroelectric material and a skin layer including a carbon structure comprising carbon atoms.

In an exemplary embodiment, the ferroelectric material may include one of nickel oxide, iron oxide, cobalt oxide, yttrium oxide, and a combination of at least one of the foregoing. The ferroelectric material may further include one of lead nickel niobate, lead iron niobate, lead cobalt niobate, yttrium niobate, and a combination of at least one of the foregoing.

In an exemplary embodiment, a ferroelectric composite may have a substantially spherical shape. A particle diameter of the ferroelectric composite may be about 5 nanometers (nm) to about 100 nanometers (nm).

In an exemplary embodiment, the carbon structure may have a carbon-carbon sp2 bond, and may include a graphite material. The carbon atoms of the carbon structure, which are adjacent to each other, may form a hexagonal ring shape or a pentagonal ring shape.

An exemplary embodiment provides a method of manufacturing a ferroelectric composite. In the method, a ferroelectric particle is prepared. The ferroelectric particle and a carbon source are injected into a plasma jet. The carbon source is decomposed and forms a skin layer on a surface of the ferroelectric particle, the skin layer including a carbon structure comprising carbon atoms.

In an exemplary embodiment, the preparing a ferroelectric particle may include mechanically grinding a ferroelectric bulk material. The carbon source may include one of methane, acetylene, ethylene, propylene, ethane, propane, butane, methanol, ethanol, light oil, heavy oil, waste oil, and a combination including at least one of the foregoing.

In an exemplary embodiment, the plasma jet may be generated by a thermal plasma torch, and a temperature of the plasma jet may be about 3,000 Kelvin (K) to about 15,000 Kelvin (K). Furthermore, an arc current of the thermal plasma torch may be about 100 amperes (A) to about 600 amperes (A).

In an exemplary embodiment, a discharging gas of the thermal plasma torch may include argon gas, and the discharging gas may further include hydrogen gas, helium gas, or both hydrogen gas and helium gas.

In an exemplary embodiment, the ferroelectric particle may be provided by a transport gas, and a flux of the transport gas may be about 20 standard liters per minute (slpm) to about 150 standard liters per minute (slpm).

An exemplary embodiment of an LCD apparatus includes a thin-film transistor ("TFT") substrate including a TFT, an opposing substrate facing the TFT substrate, a liquid crystal layer interposed between the TFT substrate and the opposing substrate and a ferroelectric composite dispersed in the liquid crystal layer. The liquid crystal layer includes a liquid crystal molecule. The ferroelectric composite includes a core and a skin layer. The core includes a ferroelectric material, and a skin layer includes a carbon structure comprising carbon atoms.

In an exemplary embodiment, a ferroelectric composite may reinforce an effective electric field in a liquid crystal layer in an LCD apparatus and may absorb impurities in the liquid crystal layer. Advantageously, an LCD apparatus including the ferroelectric composite may improve response speed, thermal stability, a driving voltage and afterimage problems.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
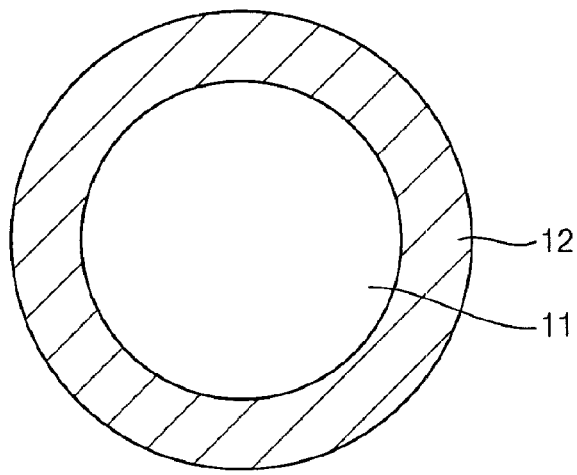
FIG. 1 is a cross-sectional view illustrating an exemplary embodiment of a ferroelectric composite according to the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below," "above," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "above" other elements or features would then be oriented "below" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

FIG. 1 is a cross-sectional view illustrating an exemplary embodiment of a ferroelectric composite according to the present invention.

Referring to FIG. 1, a ferroelectric composite 10 includes a core 11 including a ferroelectric material and an outer (skin) layer 12 including a carbon structure, such as comprising carbon atoms.

For example, the ferroelectric composite 10 may have a substantially spherical shape. In one exemplary embodiment, a particle diameter of the ferroelectric composite 10 may be about 5 nanometers (nm) to about 100 nanometers (nm).

Examples of the ferroelectric material may include nickel oxide, iron oxide, cobalt oxide, yttrium oxide, etc. In exemplary embodiments, the ferroelectric material may include lead nickel niobate, lead iron niobate, lead cobalt niobate, yttrium niobate, etc. These materials may be used alone or in a combination thereof.

In an exemplary embodiment, the ferroelectric material may be prepared by mixing and melting different metals and/or metal oxides so as to improve ferroelectric characteristics. Examples of the metal oxides may include lead magnesium niobate, lead zinc niobate, lead titanate, lithium tantalate, lithium niobate, nickel oxide, cobalt oxide, iron oxide, strontium oxide, scandium oxide, ruthenium oxide, copper oxide, cadmium oxide, etc. Examples of the metals may include platinum, gold, silver, palladium, rhodium, etc. These materials may be used alone or in a combination thereof.

The skin layer 12 surrounds the core 11 as illustrated in FIG. 1. In an exemplary embodiment, the skin layer 12 may include a carbon structure having a carbon-carbon sp2 bond. The carbon structure may include carbon atoms. Particularly, the carbon structure may include a graphite material, and one arbitrary carbon atom of the carbon structure may be combined with three adjacent carbon atoms to form three carbon-carbon sp2 bonds.

In one exemplary embodiment, six carbon atoms of the carbon structure, which are adjacent to each other, may form a hexagonal ring shape, and an angle between two carbon-carbon sp2 bonds combined with one carbon atom may be about 120°. Alternatively, five carbon atoms of the carbon structure, which are adjacent to each other, may form a pentagonal ring shape.

Examples of the carbon structure may have a flat graphite structure, a carbon nanotube, a fullerene, etc. In one exemplary embodiment, the core 11 including the ferroelectric material may be disposed in an empty central space of the carbon nanotube and/or the fullerene.

An exemplary embodiment of the ferroelectric composite may have both ferroelectric characteristics and characteristics of a carbon structure having carbon-carbon sp2 bonds. When the ferroelectric composite is employed in a liquid crystal display ("LCD") apparatus, a core of the ferroelectric composite, which includes a ferroelectric material, may reinforce an effective electric field in a liquid crystal layer of the LCD apparatus. Advantageously, a driving voltage may be reduced, and the response speed and the thermal stability of the liquid crystal layer may be improved.

Furthermore, the skin layer having the carbon-carbon sp2 bonds of carbon atoms may reduce rotational viscosities of liquid crystal molecules and may absorb impurities in the liquid crystal layer. Advantageously, response speed may be decreased, and afterimage problems may be improved. Furthermore, the skin layer protects the core to reduce of effectively prevent ferroelectric composite particles from cohering with each other and from reacting with the liquid crystal molecules in the liquid crystal layer.

Hereinafter, a method of manufacturing a ferroelectric composite according to an embodiment of the present invention will be explained more fully with reference to the drawings.

Figure 2:
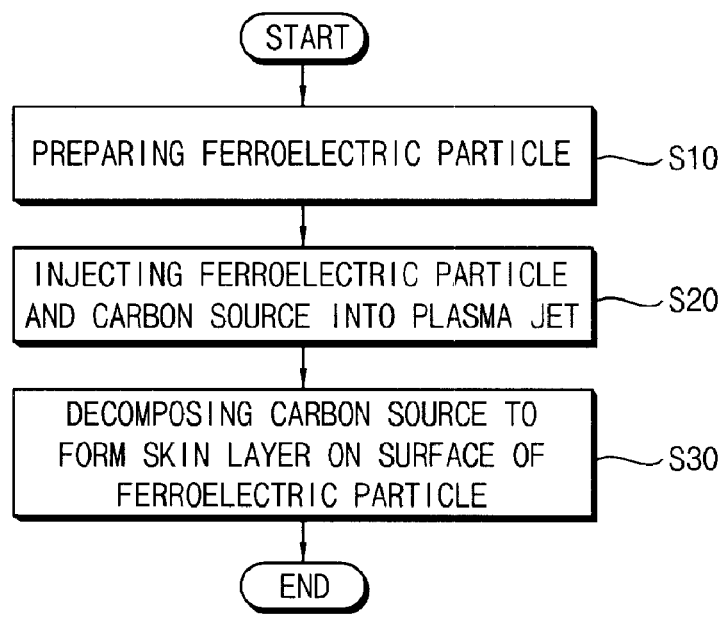
FIG. 2 is a flow chart illustrating an exemplary embodiment of a method of manufacturing a ferroelectric composite according to the present invention.

FIG. 2 is a flow chart illustrating an exemplary embodiment of a method of manufacturing a ferroelectric composite according to the present invention;

In an exemplary embodiment of a method of manufacturing a ferroelectric composite, ferroelectric particles are prepared (step S10). The ferroelectric particles and a carbon source are inserted into a plasma jet (step S20). The carbon source is decomposed to form a skin layer on a surface of each of the ferroelectric particles (step S30). In one exemplary embodiment, the skin layer includes a carbon structure comprising carbon atoms.

Examples of the ferroelectric material may include nickel oxide, iron oxide, cobalt oxide, yttrium oxide, etc. In exemplary embodiments, the ferroelectric material may include lead nickel niobate, lead iron niobate, lead cobalt niobate, yttrium niobate, etc. These materials may be used alone or in a combination thereof.

In one exemplary embodiment, the ferroelectric particles may be prepared such as including mechanically grinding a ferroelectric bulk material. A diameter of each of the ferroelectric particles may be about several micrometers to hundreds of micrometers. The ferroelectric particles may have irregular polyhedral shapes.

Figure 3:
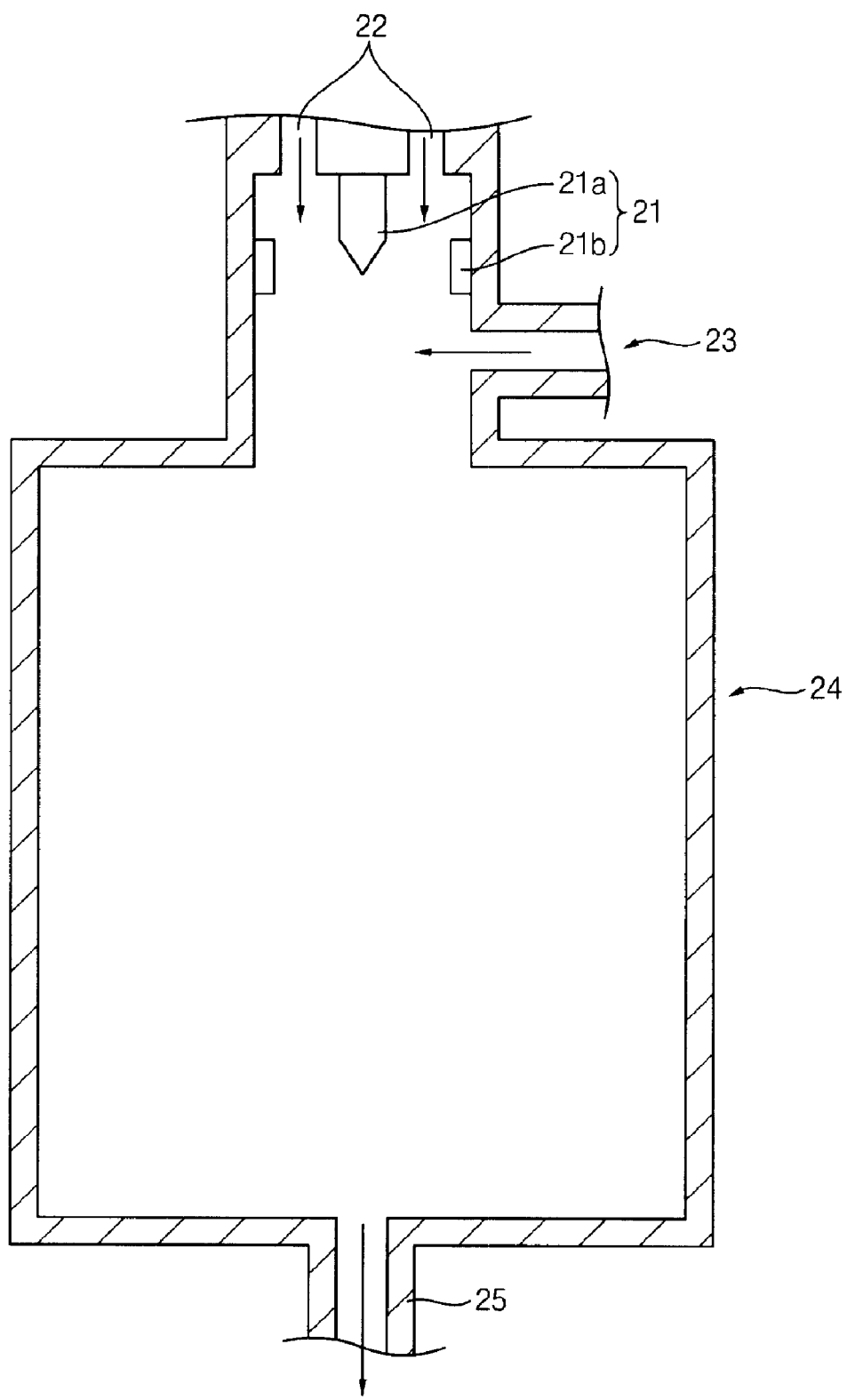
FIG. 3 is a cross-sectional view illustrating an exemplary embodiment of a plasma reaction device used in manufacturing a ferroelectric composite according to the present invention.

FIG. 3 is a cross-sectional view illustrating an exemplary embodiment of a plasma reaction device used in manufacturing a ferroelectric composite according to the present invention.

Referring to FIG. 3, a plasma reaction device 20 may include a thermal plasma torch 21, a gas inlet 22, a carbon source inlet 23 and a reaction chamber 24.

The thermal plasma torch 21 generates a plasma jet. The thermal plasma torch 21 may include a first electrode 21a and a second electrode 21b. In one exemplary embodiment, the first electrode 21a may have a protrusion having a substantially cone shape. The second electrode 21b may be spaced apart from the first electrode 21b by a predetermined distance, and may have a substantially cylindrical shape, such as to surround the first electrode 21a.

When a discharging gas is discharged by an electric field formed between the first electrode 21a and the second electrode 21b, a plasma jet having a relatively high temperature is generated. In one exemplary embodiment, the temperature of the plasma jet may be about 3,000 Kelvin (K) to about 15,000 Kelvin (K), and an arc current of the thermal plasma torch 21 may be about 100 amperes (A) to about 600 amperes (A). Examples of the thermal plasma torch 21 may include a direct current thermal plasma torch, a high frequency thermal plasma torch, etc.

The discharging gas is provided through the gas inlet 22. The discharging gas may include, but is not limited to, argon gas, and may further include hydrogen gas, helium gas, etc., in order to improve the enthalpy and thermal conductivity of the plasma jet.

A catalyst source may be provided through the gas inlet 22. The above-mentioned ferroelectric particles may be used as the catalyst source. In one exemplary embodiment, the ferroelectric particles may be similar to refined powder, and the ferroelectric particles may be provided by a transport gas. A flux of the transport gas may be about 20 to about 150 standard liters per minute (slpm). In an alternative embodiment, the catalyst source may be provided through an additional inlet, such as an inlet different from the gas inlet 22.

A surface portion of each of the ferroelectric particles injected into the plasma jet is evaporated due to the heat of the plasma jet. As a result, the size of each of the ferroelectric particles is reduced so that the ferroelectric particles become nanoparticles and having substantially spherical shapes.

The carbon source is injected into the plasma jet through the carbon source inlet 23. Examples of the carbon source may include an oil, for example, light oil, heavy oil, waste oil, etc., and/or a hydrocarbon. The hydrocarbon may include, but is not limited to, methane, acetylene, ethylene, propylene, ethane, propane, butane, methanol, ethanol, etc. These carbon sources may be used alone or in a combination thereof.

The carbon source is decomposed by the plasma jet to generate carbon radicals. The carbon radicals are combined with a surface of each of the ferroelectric particles to form carbon-carbon sp2 bonds. When the ferroelectric particles include nickel oxide, iron oxide, cobalt oxide, yttrium oxide, etc., singularly or in a combination thereof, the carbon-carbon sp2 bonds may be relatively easily formed to form a carbon structure such as a carbon nanotube. In one exemplary embodiment, each of the ferroelectric particles includes the nickel oxide. Since the nickel oxide may serve as a catalyst for forming the carbon-carbon sp2 bonds, the carbon-carbon sp2 bonds may be relatively easily formed.

After the skin layer is formed, each of the ferroelectric particles with the skin layer is cooled, such as to prepare a ferroelectric composite. In one exemplary embodiment, each of the ferroelectric particles with the skin layer may be cooled in a cooling chamber (not shown) connected to the reaction chamber 24 through an outlet 25.

In an embodiment of the present invention, a ferroelectric composite including a ferroelectric core and a skin layer may be formed using a plasma jet. The skin layer includes a carbon structure comprising carbon atoms.

Hereinafter, an exemplary embodiment of an LCD apparatus according to the present invention will be explained more fully with reference to the drawings.

Figure 4:
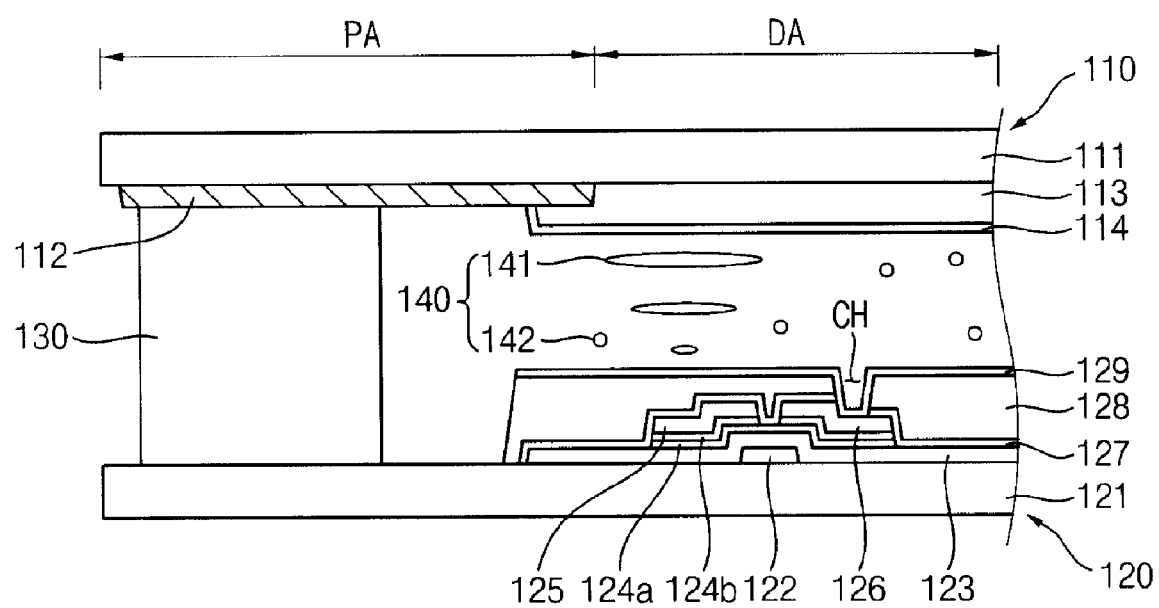
FIG. 4 is a cross-sectional view illustrating an exemplary embodiment of a liquid crystal display ("LCD") apparatus according to the present invention.

FIG. 4 is a cross-sectional view illustrating an exemplary embodiment of an LCD apparatus according to the present invention.

Referring to FIG. 4, an LCD apparatus 100 includes a thin-film transistor ("TFT") substrate 120, an opposing substrate 110, a sealing member 130 and a liquid crystal layer 140 interposed between the TFT substrate 120 and the opposing substrate 110. The LCD apparatus 100 may further include a spacer (not shown) interposed between the TFT substrate 120 and the opposing substrate 110 to maintain a cell gap between the TFT substrate 120 and the opposing substrate 110.

The opposing substrate 110 may include a base substrate 111, a light-blocking layer 112, a color filter 113 and a common electrode 114. The opposing substrate 110 may have a display area DA, and a peripheral area PA surrounding the display area DA.

Examples of a material that may be used for the base substrate 111 may include, but are not limited to, a transparent material, such as a transparent glass, etc.

The light-blocking layer 112 is disposed on the base substrate 111. Examples of a material that may be used for the light-blocking layer 112 may include an opaque material, such as a coloring agent such as carbon black, etc. The light-blocking layer 112 may reduce or effectively prevent a color mixture of light passing through the color filter 113 and may increase a resolution of the LCD apparatus. In an exemplary embodiment. The light-blocking layer 112 may be disposed between pixels of the display area DA. Furthermore, the light-blocking layer 112 may be disposed in the peripheral area PA to distinguish the peripheral area PA from the display area DA.

The color filter 113 is disposed on the base substrate 111, and may partially overlap with the light-blocking layer 112 and/or an adjacent color filter 113. Alternatively, the color filter 113 may be disposed adjacent to, contacting and/or spaced apart from the light-blocking layer 112 and/or the adjacent color filter 113. In exemplary embodiments, the color filter 113 may include a red color filter, a green color filter and a blue color filter, and the color filters may include, but are not limited to, a pigment and/or a dye corresponding to their color.

The opposing substrate 110 may further include an organic insulation layer (not shown) covering the light-blocking layer 112 and the color filter 113. The organic insulation layer protects the light-blocking layer 112 and the color filter 113, and compensates for a height difference between the light-blocking layer 112 and the color filter 113 such as to planarize a surface of the opposing substrate 110. Examples of a material that may be used for the opposing substrate 110 may include, but are not limited to, a synthetic resin such as an acrylic resin, etc.

The common electrode 114 is disposed on the base substrate 111 and covers the light-blocking layer 112 and the color filter 113. Examples of a material that may be used for the common electrode 114 may include, but are not limited to, a transparent conductive material, for example, indium tin oxide, indium zinc oxide, etc. A predetermined voltage is provided to the common electrode 114. Alternatively, the common electrode 114 may be disposed on the TFT substrate 120.

The opposing substrate 110 may further include an alignment film (not shown) to align liquid crystal molecules of the liquid crystal layer 140. Examples of a material that may be used for the alignment film may include, but are not limited to, a synthetic resin such as polyimide, etc.

The TFT substrate 120 may include a base substrate 121, a gate electrode 122, a gate insulation layer 123, a channel layer 124a, an ohmic contact layer 124b, a source electrode 125, a drain electrode 126, a passivation layer 127, a planarizing layer 128 and a pixel electrode 129.

The gate electrode 122 is disposed on the base substrate 121 and is provided with a gate signal through a gate line (not shown). Examples of a material that may be used for the gate electrode 122 may include, but are not limited to, aluminum, an aluminum alloy, molybdenum, a molybdenum alloy, chromium, etc. In exemplary embodiments, the gate electrode 122 may have a single layer structure or a multilayered structure.

The gate insulation layer 123 is disposed above and covers the gate electrode 122. Examples of a material that may be used for the gate insulation layer 123 may include, but are not limited to, an insulation material such as silicon oxide, silicon nitride, etc.

The channel layer 124a is disposed on the gate insulation layer 123, and overlaps with and corresponds to the gate electrode 122. The channel layer 124a may include amorphous silicon, but the invention is not limited thereto. A pair of ohmic contact layer 124b is disposed on the channel layer 124a. The ohmic contact layer 124b may include amorphous silicon into which impurities are implanted.

The source electrode 125 and the drain electrode 126 are disposed on the ohmic contact layer 124b. The source electrode 125 and the drain electrode 126 are spaced apart from each other, such as to expose a portion of the channel layer 124a. A portion of the drain electrode 126 is electrically connected to the pixel electrode 129 through a contact hole CH of the planarizing layer 128.

The passivation layer 127 covers the source electrode 125, the drain electrode 126 and the exposed portion of the channel layer 124a.

The planarizing layer 128 is disposed on the passivation layer 127. The planarizing layer 128 planarizes the TFT substrate 120. The contact hole CH is disposed extended through the planarizing layer 128 so that the drain electrode 126 is electrically connected to the pixel electrode 129 through the contact hole CH.

The pixel electrode 129 is disposed on the planarizing layer 128. A data voltage is applied to the pixel electrode 129 through the drain electrode 126. A voltage difference between the data voltage of the pixel electrode 129 and the common voltage of the common electrode 113 forms an electric field, so that the liquid crystal molecules of the liquid crystal layer 140 are aligned.

The opposing substrate 110 and the TFT substrate 120 are combined with each other by the sealing member 130. In exemplary embodiments, the sealing member 130 may be formed from a photo-curable composition including a binder resin, a cross-linking agent, a photo-reaction initiator, a filler, etc.

The liquid crystal layer 140 includes liquid crystal molecules 141 and ferroelectric composite particles 142. The ferroelectric composite particles 142 are dispersed in the liquid crystal layer 140. The ferroelectric composite particles 142 are substantially the same as the above-explained ferroelectric composite particles of the illustrated embodiment. Thus, any further explanation of the ferroelectric composite particles 142 will be omitted.

In an exemplary embodiment, an LCD apparatus includes ferroelectric composite particles dispersed in a liquid crystal layer. Advantageously, the response speed and the thermal stability of the LCD apparatus may be improved, and a driving voltage and afterimage problems of the LCD apparatus may be reduced.

As in the illustrated embodiments, a ferroelectric composite may have both ferroelectric characteristics and characteristics of a carbon structure having carbon-carbon sp2 bonds. The ferroelectric composite may reinforce an effective electric field in a liquid crystal layer in an LCD apparatus and may absorb impurities in the liquid crystal layer. Advantageously, an LCD apparatus including the ferroelectric composite may improve response speed, thermal stability, a driving voltage and afterimage problems.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A ferroelectric composite comprising:
a core including a ferroelectric material; and
a skin layer including a carbon structure comprising carbon atoms.

2. The ferroelectric composite of claim 1, wherein the ferroelectric material comprises one of nickel oxide, iron oxide, cobalt oxide, yttrium oxide, and a combination including at least one of the foregoing.

3. The ferroelectric composite of claim 2, wherein the ferroelectric material comprises one of lead nickel niobate, lead iron niobate, lead cobalt niobate, yttrium niobate, and a combination including at least one of the foregoing.

4. The ferroelectric composite of claim 1, wherein the ferroelectric composite has a substantially spherical shape.

5. The ferroelectric composite of claim 4, wherein a particle diameter of the ferroelectric composite is about 5 nanometers (nm) to about 100 nanometers (nm).

6. The ferroelectric composite of claim 1, wherein the carbon structure has a carbon-carbon sp2 bond.

7. The ferroelectric composite of claim 6, wherein the carbon structure comprises a graphite material.

8. The ferroelectric composite of claim 1, wherein the carbon atoms of the carbon structure, which are adjacent to each other, form a hexagonal ring shape or a pentagonal ring shape.

9. A method of manufacturing a ferroelectric composite, the method comprising:
preparing a ferroelectric particle;
injecting the ferroelectric particle and a carbon source into a plasma jet; and
decomposing the carbon source and forming a skin layer on a surface of the ferroelectric particle, the skin layer including a carbon structure comprising carbon atoms.

10. The method of claim 9, wherein the carbon structure has a carbon-carbon sp2 bond.

11. The method of claim 9, wherein the carbon atoms of the carbon structure, which are adjacent to each other, form a hexagonal ring shape or a pentagonal ring shape.

12. The method of claim 9, wherein the preparing a ferroelectric particle includes mechanically grinding a ferroelectric bulk material.

13. The method of claim 9, wherein the carbon source comprises one of methane, acetylene, ethylene, propylene, ethane, propane, butane, methanol, ethanol, light oil, heavy oil, waste oil, and a combination including at least one of the foregoing.

14. The method of claim 9, wherein the plasma jet is generated by a thermal plasma torch and an arc current of the thermal plasma torch is about 100 amperes (A) to about 600 amperes (A).

15. The method of claim 14, wherein a temperature of the plasma jet is about 3,000 Kelvin (K) to about 15,000 Kelvin (K).

16. The method of claim 14, wherein a discharging gas of the thermal plasma torch comprises argon gas.

17. The method of claim 16, wherein the discharging gas further comprises hydrogen gas, helium gas, or both hydrogen gas and helium gas.

18. The method of claim 9, wherein the ferroelectric particle is provided by a transport gas.

19. The method of claim 18, wherein a flux of the transport gas is about 20 standard liters per minute (slpm) to about 150 standard liters per minute (slpm).

20. A liquid crystal display ("LCD") apparatus comprising:
a thin-film transistor ("TFT") substrate including a thin film transistor ("TFT");
an opposing substrate facing the thin film transistor ("TFT") substrate;
a liquid crystal layer interposed between the thin film transistor ("TFT") substrate and the opposing substrate, the liquid crystal layer comprising a liquid crystal molecule; and
a ferroelectric composite dispersed in the liquid crystal layer, the ferroelectric composite comprising a core and a skin layer, the core including a ferroelectric material and the skin layer including a carbon structure comprising carbon atoms.

21. The liquid crystal display ("LCD") apparatus of claim 20, wherein the ferroelectric material comprises one of nickel oxide, iron oxide, cobalt oxide, yttrium oxide, and a combination including at least one of the foregoing.

22. The liquid crystal display ("LCD") apparatus of claim 20, wherein the ferroelectric composite has a substantially spherical shape, and a particle diameter of the ferroelectric composite is about 5 nanometers (nm) to about 100 nanometers (nm).

23. The liquid crystal display ("LCD") apparatus of claim 20, wherein the carbon structure has a carbon-carbon sp2 bond.

24. The liquid crystal display ("LCD") apparatus of claim 20, wherein the carbon structure comprises a graphite material.

25. The liquid crystal display ("LCD") apparatus of claim 20, wherein the carbon atoms of the carbon structure, which are adjacent to each other, form a hexagonal ring shape or a pentagonal ring shape.

* * * * *